US006651327B1

(12) United States Patent
Alder et al.

(10) Patent No.: US 6,651,327 B1

(45) Date of Patent: Nov. 25, 2003

(54) METHOD OF MAKING HYDROFORMED FUEL RAILS

(75) Inventors: Randall F. Alder, Fenton, MI (US); Nicholas O. Kaltsounis, Rochester Hills, MI (US); Donald B. Ford, Auburn Hills, MI (US)

(73) Assignee: Dana Corporation, Toledo, OH (US)

( * ) Notice: Subject to any disclaimer, the term of this patent is extended or adjusted under 35 U.S.C. 154(b) by 113 days.

(21) Appl. No.: 10/012,840

(22) Filed: Dec. 10, 2001

(51) Int. Cl.[7] .................................................. B23P 15/00

(52) U.S. Cl. .......................... 29/888; 29/421.1; 29/523; 72/58; 72/60

(58) Field of Search ................................ 123/456, 470; 29/421.1, 888, 523; 72/57, 58, 60, 61, 62

(56) References Cited

U.S. PATENT DOCUMENTS

| | | | | | |
|---|---|---|---|---|---|
| 4,317,348 | A | * | 3/1982 | Halene et al. | 72/62 |
| 4,660,269 | A | | 4/1987 | Suzuki | |
| 4,738,012 | A | | 4/1988 | Hughes et al. | |
| 4,763,503 | A | | 8/1988 | Hughes et al. | |
| 4,788,843 | A | * | 12/1988 | Seaman et al. | 72/58 |
| 4,899,712 | A | * | 2/1990 | De Bruyn et al. | 123/468 |
| 4,922,785 | A | | 5/1990 | Arnold et al. | |
| 4,928,509 | A | * | 5/1990 | Nakamura | 72/61 |
| 5,062,405 | A | * | 11/1991 | Daly | 123/468 |
| 5,168,625 | A | * | 12/1992 | DeGrace, Jr. | 29/888.01 |
| 5,189,782 | A | * | 3/1993 | Hickey | 29/602.1 |
| 5,435,163 | A | * | 7/1995 | Schafer | 72/58 |
| 5,737,952 | A | | 4/1998 | Baumann et al. | |
| 5,845,621 | A | * | 12/1998 | Robinson et al. | 123/456 |
| 5,961,058 | A | | 10/1999 | Kroger | |
| 6,176,114 | B1 | * | 1/2001 | Gmurowski | 72/59 |
| 6,178,632 | B1 | * | 1/2001 | Worrel et al. | 29/888.46 |
| 6,405,713 | B1 | * | 6/2002 | Scollard et al. | 123/468 |
| 6,497,128 | B1 | * | 12/2002 | Canfield et al. | 72/61 |

* cited by examiner

*Primary Examiner*—I Cuda Rosenbaum

(74) *Attorney, Agent, or Firm*—MacMillan, Sobanski & Todd, LLC

(57) ABSTRACT

A fuel rail formed by hydroforming. The hydroforming process includes applying a seal onto a fuel tube, and installing fuel injector blocks, including fuel injector ports, onto the tube in desired positions. The fuel tube assembly is placed in a die assembly, and pressurized fluid is supplied to the interior of the tube. The pressurized fluid causes the tube to expand outwardly into engagement with the blocks, and to pierce holes through the tube within each of the blocks to provide fluid communication with the associated fuel injector and other ports.

17 Claims, 2 Drawing Sheets

METHOD OF MAKING HYDROFORMED FUEL RAILS

BACKGROUND OF THE INVENTION

The present invention relates to the forming of fuel rails, and more particularly to forming fuel rails employing a hydroforming process.

Vehicles today typically employ fuel injectors to feed fuel to an engine. In particular, there are some engines that operate with direct fuel injection. In a fuel system for a direct injection engine, the fuel is transferred to the combustion chambers (cylinders) under high pressure in order to overcome the pressure within the combustion chambers. A typical high pressure fuel rail includes a hollow conduit having a plurality of U-shaped blocks provided thereon. Each of the blocks has a recessed fuel injector port formed therein to receive a portion of a fuel injector, and also typically includes a mounting member so that the block functions as a mounting bracket as well. These fuel rail assemblies have commonly been manufactured by forming a plurality of fuel holes in the conduit, then brazing or otherwise securing each of the blocks about a respective one of the holes. Although effective, this process is somewhat time consuming and inefficient. Further, it is desirable to avoid the concerns of fuel rails warping during the brazing process in order to avoid the requirement of machining after brazing. Additionally, it is desirable to reduce the chance of creating a leak path for the fuel at the brazing locations.

Thus, it is advantageous to have a fuel rail assembly and a method for manufacturing the fuel rail assembly that overcomes the drawbacks of the prior art.

SUMMARY OF INVENTION

This invention relates to an improved method for manufacturing a fuel rail assembly for use with internal combustion engines employing fuel injectors. In particular, the invention relates to an improved high pressure fuel rail assembly for use with direct injection engines.

In its embodiments, the present invention contemplates a method of manufacturing a fuel rail assembly comprising the steps of: providing a hollow tube and a plurality of blocks, wherein each of the blocks has a passage formed therethrough and a recessed fuel injector port, inserting the tube into the passages in the blocks; mounting the tube and blocks in a hydroforming die, and positioning the blocks in desired positions relative to the tube; supplying pressurized fluid to the interior of the tube, causing the tube to expand outwardly into engagement with the blocks; and piercing holes through the tube within each of the blocks to provide fluid communication with the associated recessed fuel injector ports.

The present invention further contemplates a method of manufacturing a fuel rail assembly comprising the steps of: providing a hollow tube and a plurality of blocks, wherein each of the blocks has a passage formed therethrough and a recessed fuel injector port; providing at least one seal; inserting the tube into the passages in the blocks; locating the seal between the tube and at least one of the passages; mounting the tube and blocks in a hydroforming die, and positioning the blocks in desired positions relative to the tube; and supplying pressurized fluid to the interior of the tube, causing the tube to expand outwardly into engagement with the seal and the blocks.

The present invention also contemplates a fuel injector assembly formed by one of the above noted methods.

Accordingly, an object of the present invention is to form an improved fuel rail assembly employing a hydroforming process.

An advantage of the present invention is that the fuel rail assembly can be formed more efficiently.

Another advantage of the present invention is that the fuel rail assembly formed is less likely to be warped or have potential fuel leak paths.

BRIEF DESCRIPTION DRAWINGS

DETAILED DESCRIPTION

Figure 1:
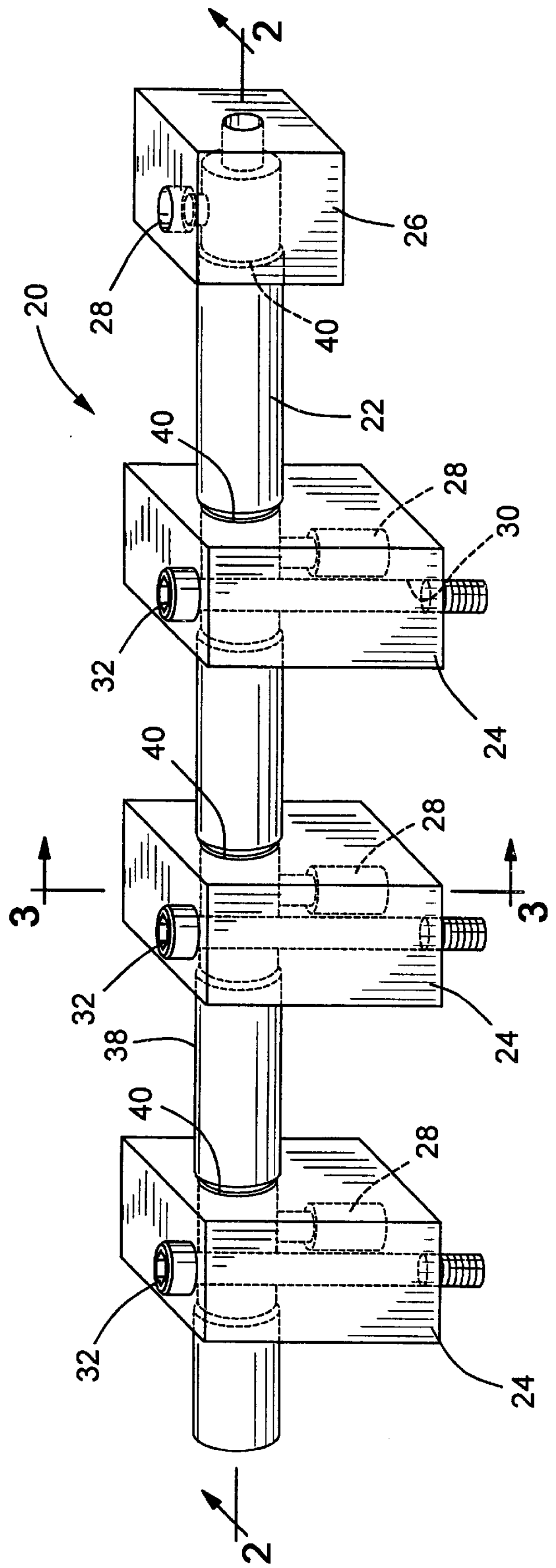
FIG. 1 is a schematic, perspective view of a portion of a fuel rail assembly formed in accordance with the present invention.
Figure 3:
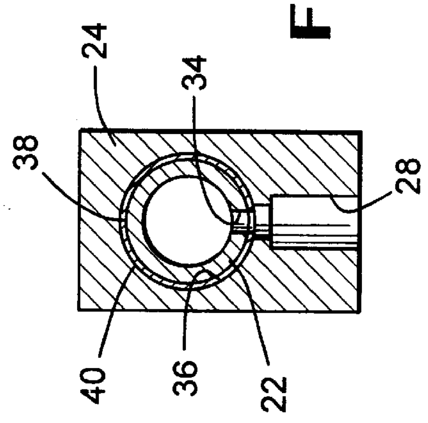
FIG. 3 is a partial, cross sectional view taken along line 3—3 in FIG. 1.
Figure 2:
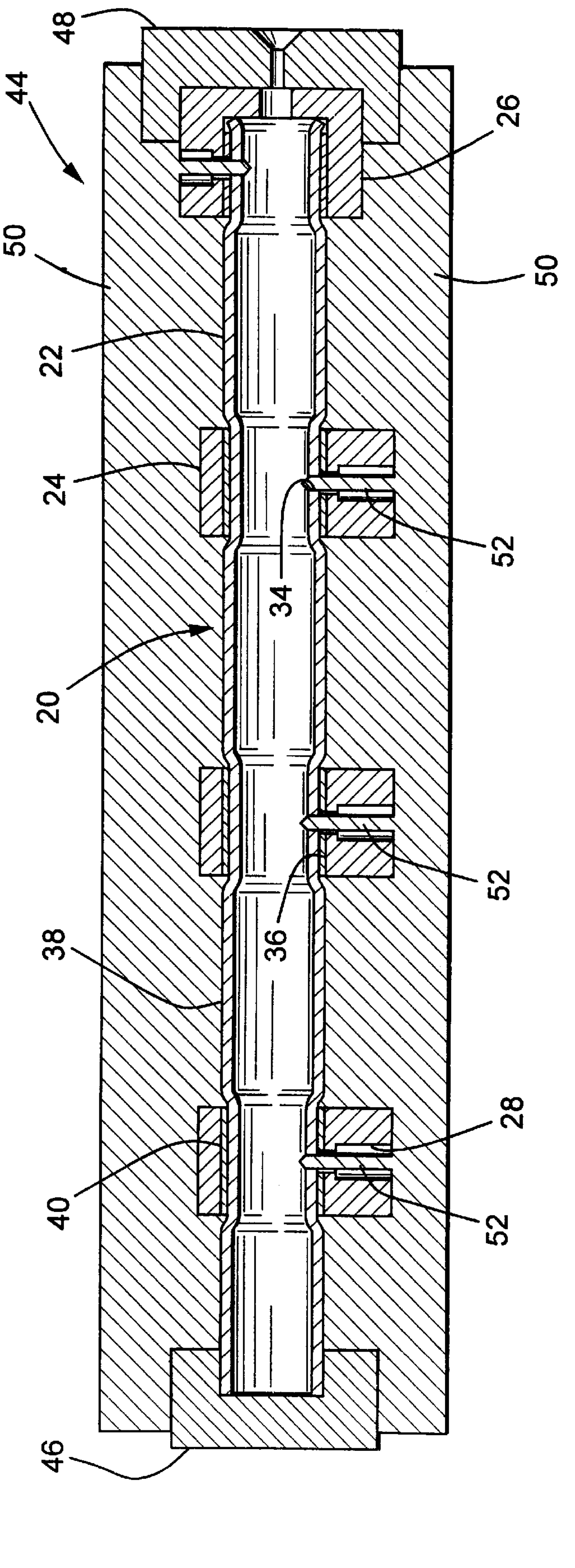
FIG. 2 is a sectional view taken along line 2—2 in FIG. 1, and also shows a schematic of the dies employed in accordance with the methods of the present invention.

FIGS. 1–3 illustrate a fuel rail assembly 20 for a typical high pressure fuel, direct injected engine (not shown). The fuel rail assembly 20 includes a main fuel tube 22, with three spaced fuel injector/mounting blocks 24 and one end feed block 26 mounted thereon. Each block 24, 26 includes a fuel tube passage 36 for receiving the outer surface 38 of the fuel tube 22 therethrough. The injector/mounting blocks 24 also include cavities that form fuel injector ports 28, which are shaped to receive high pressure fuel injectors (not shown). The three fuel injector/mounting blocks 24 each include a mounting bore 30 extending through the blocks 24 for receiving mounting bolts 32, that mount to the engine. Thus, these blocks 24 act as both supports for the fuel injectors themselves, and also the mechanism for mounting the fuel rail assembly 20 to the engine. The feed block 26 includes a cavity 29 that forms a cross feed port for a cross feed tube (not shown).

The finished tube 20 includes four hydropierced holes 34, one at each of the three blocks 24 aligning with its respective injector port 28, and one at the block 26 to communicate with the cross feed port. Since these holes 34 are formed during the hydroforming process itself (as discussed below), they needn't be in the fuel tube 22 prior to the hydroforming process. The blocks 24, 26 are fabricated so that each of the passages 36 has a diameter approximately 0.01 to 0.02 inches (0.25 to 0.5 mm) larger than the initial diameter of the outside surface 38 of the fuel tube 22. This initial difference in diameters may vary depending upon the size and thickness of the components, and what type of seal is used, if any, as is desired for the particular fuel rail assembly being formed.

It is preferred, as is shown in this embodiment, to have seals 40 between the fuel tube outer surface 38 and the fuel tube passages 36. These seals 40 are desired because the fuel rail assembly 20 must retain, without leakage, high pressure fuel as it flows to the engine, under various environmental conditions. The advantage of having these seals 40, then, is to improve the sealing properties by reducing the chances for a leak path between the tube outside surface 38 and the passage 36.

The relative thickness of the seals 40 are shown exaggerated for clarity in describing the invention. The actual thickness of the seals depends upon the particular type of seal used, among other factors, as is discussed below, but is generally on the order of 0.2 mm or less.

The seals 40 can be an adhesive, a sealant, and/or metal, rubber or plastic. If the seal 40 is made of a sealant, then the preferred method is to pre-coat the fuel tube outer surface 38 at least at the locations where the tube holes 34 will be formed prior to installing the blocks 24, 26. The preferred sealant is a pre-applied sealant, which is an application where a liquid medium suspends tiny capsules of sealant. This pre-applied sealant is applied to the fuel tube surface 38 at the appropriate locations and allowed to dry. Then, during the hydroforming process, the high pressure will cause the capsules to rupture, and the sealant will flow and bond to the surfaces.

If the seal 40 is made of an adhesive, then it is preferred to pre-coat the tube outer surface 38 at the hole 34 locations with a pre-applied adhesive. These adhesives contain tiny capsules of resin and capsules of hardener that are suspended in a liquid medium. The liquid medium is applied to the tube surface 38, where a hole 38 will be formed, and is allowed to dry. During the hydroforming process, the high pressure between the tube outer surface 38 and the fuel tube passages 36 will cause the capsules containing the resin and the capsules containing the hardener to rupture, allowing the hardener & resin to mix, thus forming a tight adhesive seal.

Instead of, or in addition to, the sealant or adhesive, each seal 40 can include a small strip or coating of material sandwiched between each fuel tube passage 36 and the corresponding portion of the tube outer surface 38. The sealant or adhesive may be placed on either or both sides of the material, as is desired for the particular application.

This material can be a flexible rubber or plastic. It can also be a ductile metal, such as copper. This ductile metal can be coated on the surface of the fuel tube using conventional processes for coating of metals on objects, such as plating or flashing, and can be applied locally, or along the whole tube. In the alternative, the soft metal can take the form of very thin, for example 0.005 inches (0.13 mm) thick, tubular sleeves, each slid between the fuel tube outer surface 38 and a corresponding fuel tube passage 36. The ductile metal can also be a very thin strip of shim stock, that is wrapped around the fuel tube 22, with a slight overlapping of the ends of the shim to assure a complete seal.

FIG. 2 schematically illustrates the fuel rail assembly 20 after forming, but while still mounted in a hydroforming die assembly 44. This assembly 44 can include a first end die 46 for sealing one end of the tube 22, and a second end die 48 for sealing the other end of the tube 22 and providing a conduit for feeding the high pressure fluid into the tube 22 during the hydroforming process. This assembly 44 can also include two side dies 50 for surrounding and controlling the expansion of the tube 22. The two side dies 50 each include piercing pins 52, which translate radially inward on hydraulic pistons (not shown), for creating the hydropierced holes in the fuel tube 22 during the hydroforming process. The particular number and configuration of hydroforming dies can vary as is desired, and so the die assembly 44 shown is for illustrative purposes only.

The hydroforming process for the fuel rail assembly 20 will now be described. The seals 40 are mounted or formed on the tube outer surface 38. Each of the blocks 24, 26 is then loaded on the fuel tube 22. The assembly 20 is placed in the hydroforming die assembly 44, with each of the parts at the desired location and orientation, and the die assembly is closed.

The hydroforming now takes place. Pressurized fluid (such as water) is supplied through the second end die 48 to the interior of the fuel tube 22. To accomplish this, a conventional end feed cylinder (not shown) sealingly engages the second end die 48 in a well known manner. The pressure of the fluid within the tube 22 is increased in a well known manner to such a magnitude that the fuel tube 22 is expanded outwardly into conformance with the die cavity defined by the die assembly 44 and against the fuel tube passages 36, swaging the blocks 24, 26 in place. As a result, the fuel tube 22 is deformed into the desired final shape. One will note that the amount of tube expansion illustrated in FIG. 2 is shown exaggerated for visualization purposes.

If a sealant or adhesive is used for the seal 40, the pressure will rupture the capsules. If a ductile metal is used for the seal 40, then the pressure will deform the metal, forming a tight seal. At the same time, the holes 34 are pierced through the seals 40 and tube 22, within each of the blocks 24, 26, to provide fluid with the associated recessed fuel injector ports 28. The fuel rail assembly may then be removed from the hydroforming dies, and the part is essentially complete, except for some conventional post processing, such as plugging an open end of the fuel rail with an end cap (not shown) in a conventional manner.

Although this embodiment shows three fuel injector blocks 24, which can be used, for example, as one side of a fuel rail assembly in a V-6 engine, fuel rails with other numbers of fuel injectors are also within the scope of the present invention. The fuel rail assembly of the particular embodiment includes three main blocks and one end block, although various numbers of blocks may be employed depending upon the engine and fuel injector configuration. Also, while the blocks 24 include both a fuel injector port and a mounting bore, one can employ two sets of separate blocks, with one set having fuel injector ports and the other including the mounting bores, if so desired. Moreover, while the preferred embodiment describes a high pressure fuel rail for a direct injection engine, the present invention is also applicable to fuel rails for conventional fuel injected engines.

While certain embodiments of the present invention have been described in detail, those familiar with the art to which this invention relates will recognize various alternative designs and embodiments for practicing the invention as defined by the following claims.

What is claimed is:

1. A method of manufacturing a fuel rail assembly comprising the steps of:

providing a hollow tube and a plurality of blocks, wherein each of the blocks has a passage formed therethrough and a recessed fuel injector port;

inserting the tube into the passages in the blocks;

mounting the tube and blocks in a hydroforming die, and positioning the blocks in desired positions relative to the tube;

supplying pressurized fluid to the interior of the tube, causing the tube to expand outwardly into engagement with the blocks; and piercing holes through the tube within each of the blocks to provide fluid communication with the associated recessed fuel injector ports.

2. The method of claim 1 further including the steps of providing a seal; and locating the seal between the tube and at least one of the passages prior to the step of supplying pressurized fluid.

3. The method of claim 2 wherein the step of providing a seal includes providing a seal formed by a sealant.

4. The method of claim 3 wherein the step of providing a seal further includes providing a metallic layer in contact with the sealant.

5. The method of claim 2 wherein the step of providing a seal includes providing a seal formed by an adhesive.

6. The method of claim 5 wherein the step of providing a seal further includes providing a metallic layer in contact with the adhesive.

7. The method of claim 2 wherein the step of providing a seal includes providing a seal made of rubber.

8. The method of claim 2 wherein the step of providing a seal includes providing a seal made of plastic.

9. The method of claim 2 wherein the step of providing a seal includes providing a seal made of metal.

10. A method of manufacturing a fuel rail assembly comprising the steps of:

providing a hollow tube and a plurality of blocks, wherein each of the blocks has a passage formed therethrough and a recessed fuel injector port;

providing at least one seal;

inserting the tube into the passages in the blocks;

locating the seal between the tube and at least one of the passages;

mounting the tube and blocks in a hydroforming die, and positioning the blocks in desired positions relative to the tube; and supplying pressurized fluid to the interior of the tube, causing the tube to expand outwardly into engagement with the seal and the blocks.

11. The method of claim 10 wherein the step of supplying pressurized fluid further includes piercing holes through the tube within each of the blocks to provide fluid communication with the associated recessed fuel injector ports.

12. The method according to claim 10 wherein the step of providing at least one seal includes providing at least one seal formed by a sealant.

13. The method according to claim 10 wherein the step of providing at least one seal includes providing at least one seal formed by an adhesive.

14. The method according to claim 10 wherein the step of providing at least one seal includes providing a seal made of metal.

15. A method of manufacturing a fuel rail assembly comprising the steps of:

providing a hollow tube and a plurality of blocks, wherein each of the blocks has a passage formed therethrough and a recessed fuel injector port;

providing at least one seal;

inserting the tube into the passages in the blocks;

locating the seal between the tube and at least one of the passages;

mounting the tube and blocks in a hydroforming die, and positioning the blocks in desired positions relative to the tube;

supplying pressurized fluid to the interior of the tube, causing the tube to expand outwardly into engagement with the seal and the blocks; and piercing holes through the tube within each of the blocks to provide fluid communication with the associated recessed fuel injector ports.

16. The method of claim 15 wherein the step of providing at least one seal includes providing a seal made of copper.

17. The method of claim 16 wherein the step of providing at least one seal includes providing one copper seal for each passage.

* * * * *